US012036807B2

(12) United States Patent
Iwasaki

(10) Patent No.: US 12,036,807 B2
(45) Date of Patent: Jul. 16, 2024

(54) THERMAL TRANSFER SHEET, INTERMEDIATE TRANSFER MEDIUM, AND PRINTED OBJECT MANUFACTURING METHOD

(71) Applicant: Dai Nippon Printing Co., Ltd., Tokyo (JP)

(72) Inventor: Yuki Iwasaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 175 days.

(21) Appl. No.: 17/628,962

(22) PCT Filed: Aug. 28, 2020

(86) PCT No.: PCT/JP2020/032728
§ 371 (c)(1),
(2) Date: Jan. 21, 2022

(87) PCT Pub. No.: WO2021/040013
PCT Pub. Date: Mar. 4, 2021

(65) Prior Publication Data
US 2022/0274433 A1 Sep. 1, 2022

(30) Foreign Application Priority Data
Aug. 30, 2019 (JP) ................................ 2019-159033

(51) Int. Cl.
*B41M 5/382* (2006.01)
*B41M 5/42* (2006.01)
(Continued)

(52) U.S. Cl.
CPC ........ *B41M 5/38257* (2013.01); *B41M 5/382* (2013.01); *B41M 5/42* (2013.01);
(Continued)

(58) Field of Classification Search
CPC .... B41M 5/38257; B41M 5/42; B41M 5/426; B41M 2205/10; B41M 2205/38;
(Continued)

(56) References Cited

U.S. PATENT DOCUMENTS

2004/0209774 A1 10/2004 Odamura et al.
2007/0160912 A1 7/2007 Odamura et al.
(Continued)

FOREIGN PATENT DOCUMENTS

JP H05-212095 A 8/1993
JP H06-263611 A 9/1994
(Continued)

OTHER PUBLICATIONS

English translation of the International Preliminary Report on Patentability (Chapter I) dated Mar. 10, 2022 (Application No. PCT/JP2020/032728).
(Continued)

*Primary Examiner* — Yaovi M Ameh
(74) *Attorney, Agent, or Firm* — BURR PATENT LAW, PLLC

(57) ABSTRACT

A thermal transfer sheet according to the present disclosure includes a first substrate and a transfer layer including at least a peeling layer, the peeling layer containing a resin material and antimicrobial particles, the antimicrobial particles having an average particle size in the range of 1 to 8 μm, and the peeling layer having a content of the antimicrobial particles in the range of 2.8 to 8 parts by mass per 100 parts by mass of the resin material.

11 Claims, 3 Drawing Sheets

(51) Int. Cl.
*B41M 5/52* (2006.01)
*B44C 1/17* (2006.01)
*B41M 7/00* (2006.01)

(52) U.S. Cl.
CPC .............. *B41M 5/426* (2013.01); *B41M 5/52* (2013.01); *B44C 1/1725* (2013.01); *B41M 7/0027* (2013.01); *B41M 2205/10* (2013.01); *B41M 2205/38* (2013.01); *B44C 1/17* (2013.01); *B44C 1/172* (2013.01)

(58) Field of Classification Search
CPC ...... B41M 7/0027; B41M 5/382; B41M 5/52; B44C 1/172; B44C 1/1725; B44C 1/17
See application file for complete search history.

(56) References Cited

U.S. PATENT DOCUMENTS

| | | | |
|---|---|---|---|
| 2016/0067997 | A1 | 3/2016 | Oomura et al. |
| 2016/0082707 | A1 | 3/2016 | Oomura et al. |
| 2019/0092040 | A1 | 3/2019 | Yoda et al. |

FOREIGN PATENT DOCUMENTS

| | | | | | |
|---|---|---|---|---|---|
| JP | H06263611 | A | * | 9/1994 | ............ A01N 59/16 |
| JP | H09-086056 | A | | 3/1997 | |
| JP | H11-034240 | A | | 2/1999 | |
| JP | H11-034591 | A | | 2/1999 | |
| JP | H11-139094 | A | | 5/1999 | |
| JP | H11-277685 | A | | 10/1999 | |
| JP | 2012-071447 | A | | 4/2012 | |
| JP | 2015-091633 | A | | 5/2015 | |
| JP | 2015-091636 | A | | 5/2015 | |
| JP | 2015091636 | A | * | 5/2015 | ............ B32B 27/08 |

OTHER PUBLICATIONS

International Search Report and Written Opinion (Application No. PCT/JP2020/032728) dated Nov. 10, 2020 (with English translation).
Extended European Search Report (Application No. 20855909.6) dated Aug. 2, 2023 (9 pages).

* cited by examiner

THERMAL TRANSFER SHEET, INTERMEDIATE TRANSFER MEDIUM, AND PRINTED OBJECT MANUFACTURING METHOD

TECHNICAL FIELD

The present disclosure relates to a thermal transfer sheet, an intermediate transfer medium, a printed material, a method for producing a printed material, and a printed material production system.

BACKGROUND ART

A sublimation thermal transfer system can easily form high-quality images that have high transparency as well as high reproducibility and good gradation of neutral colors and are comparable to traditional full-color photographic images. Thus, the sublimation thermal transfer system is widely used to form thermal transfer images. The sublimation thermal transfer system is a method for producing a printed material in which a thermal transfer sheet and a transfer-receiving article are used. The thermal transfer sheet includes a coloring layer containing a sublimation dye on a surface of a substrate. The method includes heating a back layer of the thermal transfer sheet to sublimate and transfer the sublimation dye contained in the coloring layer to a receiving layer, thereby forming an image and producing a printed material. The substrate of the thermal transfer sheet is hereinafter referred to as a first substrate.

A thermal transfer image formed on the receiving layer by the sublimation thermal transfer system has good gradation. However, the image formed on the outermost surface of the printed material has low durability, such as scratch resistance, and deteriorates over time.

To solve these problems, a thermal transfer sheet has a transfer layer including a protective layer, and the transfer layer is transferred to a surface on which an image is formed of a printed material to improve the durability of the printed material.

In another method for producing a printed material, a method using an intermediate transfer medium is known. The intermediate transfer medium includes a substrate, a peeling layer, and a transferable receiving layer. An image is formed on the receiving layer using a thermal transfer sheet or the like, and the peeling layer and the receiving layer are transferred from the intermediate transfer medium onto a transfer-receiving article. The substrate of the intermediate transfer medium is hereinafter referred to as a second substrate.

Such a printed material is used for identification cards, ID cards, and the like. In recent years, however, in a medical setting or the like, a printed material has sometimes been required to have good antimicrobial properties to prevent bacteria, such as *Escherichia coli*, from growing on the printed material and becoming a source of infection.

PTL 1 discloses that a transfer layer containing an inorganic antimicrobial agent is transferred from a thermal transfer sheet onto a printed material to improve the durability and antimicrobial properties of the printed material.

CITATION LIST

Patent Literature

PTL 1: Japanese Unexamined Patent Application Publication No. 2012-71447

SUMMARY OF INVENTION

Technical Problem

The present disclosers have found a new problem that the thermal transfer sheet disclosed in PTL 1 has poor adhesion between a substrate and the transfer layer and has a possibility of the transfer layer separating from the substrate when unheated, that is, foil delamination.

The present disclosers have found that both the antimicrobial properties and the foil adherence of a thermal transfer sheet can be achieved by setting the average particle size of antimicrobial particles contained in a peeling layer of a transfer layer and the antimicrobial particle content within a specific numerical range.

The present disclosers have also found that both the antimicrobial properties and the foil adherence of an intermediate transfer medium can be achieved by incorporating antimicrobial particles into a peeling layer of the intermediate transfer medium and setting the average particle size of the antimicrobial particles and the antimicrobial particle content within a specific numerical range.

Accordingly, it is an object of the present disclosure to provide a thermal transfer sheet and an intermediate transfer medium each having good antimicrobial properties and high foil adherence.

It is another object of the present disclosure to provide a printed material produced using the thermal transfer sheet or the intermediate transfer medium.

It is still another object of the present disclosure to provide a method for producing a printed material using the thermal transfer sheet or the intermediate transfer medium.

It is still another object of the present disclosure to provide a printed material production system for producing the printed material.

Solution to Problem

A thermal transfer sheet according to the present disclosure includes a first substrate and a transfer layer including at least a peeling layer, the peeling layer containing a resin material and antimicrobial particles, the antimicrobial particles having an average particle size in the range of 1 to 8 μm, and the peeling layer having a content of the antimicrobial particles in the range of 2.8 to 8 parts by mass per 100 parts by mass of the resin material.

A printed material according to the present disclosure is a printed material produced using the thermal transfer sheet and includes a transfer-receiving article and the transfer layer.

A method for producing a printed material according to the present disclosure is a method for producing the above printed material and includes the steps of providing the thermal transfer sheet and a transfer-receiving article and transferring the transfer layer of the thermal transfer sheet onto the transfer-receiving article.

An intermediate transfer medium according to the present disclosure includes a second substrate, a peeling layer, and a receiving layer, the peeling layer containing a resin material and antimicrobial particles, the antimicrobial particles having an average particle size in the range of 1 to 8 μm, and the peeling layer having a content of the antimicrobial particle in the range of 2.8 to 8 parts by mass per 100 parts by mass of the resin material.

A printed material according to the present disclosure is a printed material produced using the intermediate transfer medium and includes a transfer-receiving article, the peeling layer, and the receiving layer.

A method for producing a printed material according to the present disclosure is a method for producing the above printed material and includes the steps of providing the intermediate transfer medium and a transfer-receiving article, forming an image on the receiving layer of the intermediate transfer medium, and transferring the peeling layer and the receiving layer of the intermediate transfer medium onto the transfer-receiving article.

A printed material production system according to the present disclosure is a system for producing the printed material and includes a thermal transfer printer and a sterilization mechanism.

Advantageous Effects of Invention

The present disclosure can provide a thermal transfer sheet and an intermediate transfer medium each having high antimicrobial properties and foil adherence.

The present disclosure can provide a printed material produced using the thermal transfer sheet or the intermediate transfer medium.

The present disclosure can provide a method for producing a printed material using the thermal transfer sheet or the intermediate transfer medium.

The present disclosure can provide a printed material production system for producing the printed material.

DESCRIPTION OF EMBODIMENTS (Thermal Transfer Sheet)

Figure 1:
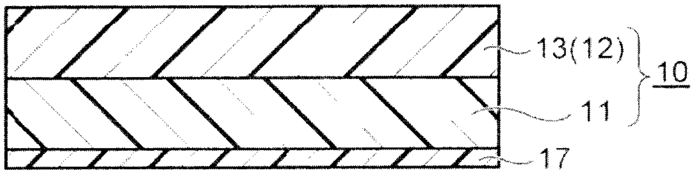
FIG. 1 is a schematic cross-sectional view of an embodiment of a thermal transfer sheet according to the present disclosure.

As illustrated in FIG. 1, a thermal transfer sheet 10 according to the present disclosure includes a first substrate 11 and a transfer layer 13 including at least a peeling layer 12. In a printed material produced using the thermal transfer sheet 10, the transfer layer 13 is located at its outermost surface.

Figure 2:
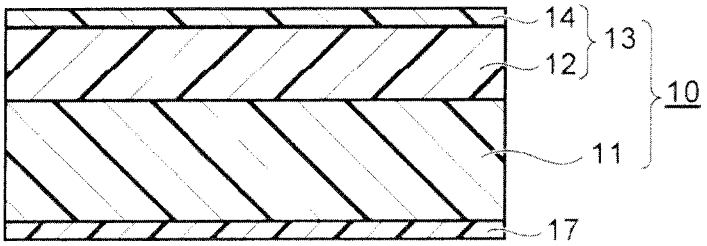
FIG. 2 is a schematic cross-sectional view of an embodiment of a thermal transfer sheet according to the present disclosure.

In one embodiment, as illustrated in FIG. 2, the transfer layer 13 includes an adhesive layer 14 at the outermost surface of the transfer layer.

Figure 3:
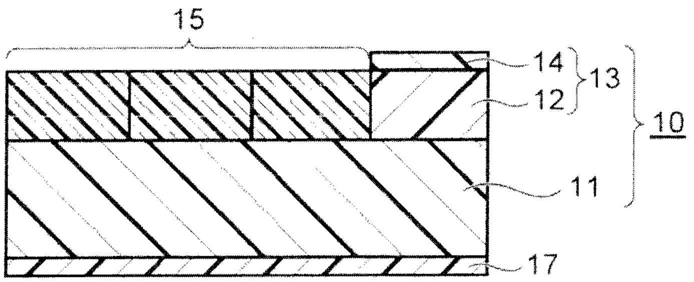
FIG. 3 is a schematic cross-sectional view of an embodiment of a thermal transfer sheet according to the present disclosure.

In one embodiment, as illustrated in FIG. 3, the thermal transfer sheet 10 includes a coloring layer 15 in a frame sequential manner with the transfer layer 13. As illustrated in FIG. 3, the thermal transfer sheet 10 may include a plurality of coloring layers 15.

In one embodiment, as illustrated in FIGS. 1 to 4, the thermal transfer sheet 10 includes a back layer 17 on the opposite surface of the first substrate 11 from its surface on which the transfer layer 13 is formed.

In one embodiment, the thermal transfer sheet 10 according to the present disclosure may further include a release layer (not shown in the figures) on the first substrate.

When the coloring layer 15 is a melt transfer coloring layer, the thermal transfer sheet 10 according to the present disclosure may include a second peeling layer (not shown in the figures) between the first substrate 11 and the coloring layer 15.

Each layer of the thermal transfer sheet according to the present disclosure is described below.

(First Substrate)

The first substrate may be any substrate that has heat resistance to withstand thermal energy applied during thermal transfer, mechanical strength to support a transfer layer or the like on the first substrate, and solvent resistance.

The first substrate may be a film formed of a resin material, the film hereinafter referred to simply as a "resin film". Examples of the resin material include polyesters, such as poly(ethylene terephthalate) (PET), poly(butylene terephthalate) (PBT), poly(ethylene naphthalate) (PEN), poly(1,4-cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP) and polymethylpentene; vinyl resins, such as poly(vinyl chloride), poly(vinyl alcohol) (PVA), poly(vinyl acetate), vinyl chloride-vinyl acetate copolymers, poly(vinyl butyral), and polyvinylpyrrolidone (PVP); (meth)acrylic resins, such as polyacrylates, polymethacrylates, and poly(methyl methacrylate); imide resins, such as polyimides and polyetherimides; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among these resins, in terms of heat resistance and mechanical strength, polyesters, such as PET and PEN, are preferred, and PET is particularly preferred.

In the present disclosure, "(meth)acrylic" includes both "acrylic" and "methacrylic". "(Meth)acrylate" includes both "acrylate" and "methacrylate".

The first substrate may be a laminate of the resin films. The laminate of the resin films can be formed by a dry lamination method, a wet lamination method, or an extrusion method.

When the first substrate is a resin film, the resin film may be a stretched film or an unstretched film. The resin film is preferably a uniaxially or biaxially stretched film in terms of strength.

The first substrate preferably has a thickness in the range of 2 to 25 μm, more preferably 3 to 16 μm. This can improve the mechanical strength of the first substrate and the transfer of thermal energy during thermal transfer.

(Transfer Layer)

The thermal transfer sheet according to the present disclosure includes a transfer layer, and the transfer layer includes at least a peeling layer. In the present disclosure, the peeling layer is a layer closest to the first substrate in the transfer layer.

In one embodiment, the transfer layer includes an adhesive layer on the peeling layer.

(Peeling Layer)

The peeling layer contains a resin material and antimicrobial particles.

The resin material may be a polyester, a polyamide, a polyolefin, a vinyl resin, a (meth)acrylic resin, an imide resin, a cellulose resin, a styrene resin, a polycarbonate, or an ionomer resin. Among these, a (meth)acrylic resin is preferred in terms of high dispersibility of antimicrobial particles, and high foil adherence (also referred to as substrate adherence) and good foil cutting properties of the thermal transfer sheet.

The resin material preferably has a glass transition temperature (Tg) in the range of 40° C. to 130° C. This can enhance the plasticizing material resistance of a printed material.

In the present disclosure, Tg of the resin material is determined by differential scanning calorimetry (DSC) in accordance with JIS K 7121.

The resin material content of the peeling layer preferably ranges from 50% to 95% by mass, more preferably 70% to 90% by mass. This can further improve the foil adherence of the thermal transfer sheet.

The antimicrobial particles may be a phosphate, zeolite, or tobermorite on which antimicrobial metal ions are supported. In the present disclosure, zeolite refers to an aluminosilicate having voids in its crystal structure, and tobermorite refers to a crystalline calcium silicate hydrate.

Examples of the antimicrobial metal ions include gold ions, silver ions, palladium ions, platinum ions, cadmium ions, cobalt ions, nickel ions, copper ions, zinc ions, and tin ions. Among these, in terms of antimicrobial properties, silver ions, copper ions, nickel ions, and zinc ions are preferred, and silver ions and zinc ions are particularly preferred.

Two or more types of antimicrobial metal ions may be supported on the phosphate or the like, and the peeling layer may contain two or more types of antimicrobial particles.

The antimicrobial metal ions may be supported by an ion exchange method or a silver mirror reaction.

The antimicrobial particles are preferably a phosphate on which silver ions are supported, particularly preferably a phosphate on which silver ions and zinc ions are supported.

The antimicrobial particles have an average particle size in the range of 1 to 8 μm, more preferably 1.5 to 4.5 μm. This can improve the foil adherence of the thermal transfer sheet. This can also improve the plasticizing material resistance of a printed material produced using the thermal transfer sheet according to the present disclosure.

In the present disclosure, the average particle size of the antimicrobial particles is determined as described below.

A scanning electron microscope (S-4700, manufactured by Hitachi, Ltd.) is used to photograph the transfer layer side of the thermal transfer sheet at a magnification of 5000. The antimicrobial particles are discriminated from other particles by energy dispersive X-ray analysis. Using image analysis software ImageJ, 20 antimicrobial particles in the photograph are randomly selected to determine the average of the maximum diameters of primary particles. The average is defined as the average particle size of the antimicrobial particles.

The average particle size of the antimicrobial particles may also be determined on the transfer layer transferred onto a transfer-receiving article.

The antimicrobial particle content of the peeling layer ranges from 2.8 to 8 parts by mass per 100 parts by mass of the resin material. This can improve the antimicrobial properties and foil adherence of the thermal transfer sheet. This can also improve the plasticizing material resistance of a printed material.

The antimicrobial particle content preferably ranges from 2.8 to 6 parts by mass, more preferably 2.8 to 4.5 parts by mass.

The peeling layer preferably contains an antistatic material. This can improve the antimicrobial properties of the thermal transfer sheet. This can also reduce the number of antimicrobial particles to be used and improve the foil adherence of the thermal transfer sheet. This can also improve the handling of a printed material produced.

Examples of the antistatic material include high-molecular-weight antistatic materials, such as (meth)acrylate resins containing a quaternary ammonium salt, poly(ethylene oxide)s, polyether ester amides, polyether amide imides, poly(ethylene oxide)-epichlorohydrin copolymers, and polyether-polyolefin copolymers; and low-molecular-weight antistatic materials, such as a glycerin fatty acid esters, polyoxyethylene alkyl ethers, polyoxyethylene alkylphenyl ethers, alkyl sulfonates, alkylbenzene sulfonates, tetraalkylammonium salts, trialkylbenzyl ammonium salts, and alkyl betaines.

Among these, when the peeling layer contains a (meth) acrylic resin, (meth)acrylate resins containing a quaternary ammonium salt are preferred in terms of dispersion stability in the peeling layer.

The peeling layer may contain two or more types of antistatic materials.

The antistatic material content of the peeling layer preferably ranges from 0.1 to 20 parts by mass, more preferably 1 to 10 parts by mass, per 100 parts by mass of the resin material. This can further improve the antimicrobial properties and foil adherence of the thermal transfer sheet. This can also further improve the handling of a printed material.

The peeling layer may contain an additive material, such as a filler, a plasticizing material, an ultraviolet absorbing material, inorganic particles, organic particles, a release material, or a dispersing material.

The peeling layer preferably has a thickness in the range of 0.5 to 5 μm, more preferably 0.5 to 3 μm. This can further improve the antimicrobial properties and foil adherence of the thermal transfer sheet. This can also improve the transferability of the transfer layer.

The ratio of the average particle size of the antimicrobial particles to the thickness of the peeling layer (the average particle size of the antimicrobial particles/the thickness of the peeling layer) preferably ranges from 1 to 8, more preferably 1.5 to 6.5. This can further improve the antimicrobial properties and foil adherence of the thermal transfer sheet. This can also improve the plasticizing material resistance of a printed material.

The peeling layer can be formed by applying a coating liquid prepared by dispersing or dissolving the above materials in water or an appropriate solvent to the first substrate or the like by known means to form a coating film and drying the coating film. The known means may be a roll coating method, a reverse roll coating method, a gravure coating method, a reverse gravure coating method, a bar coating method, or a rod coating method.

(Adhesive Layer)

In one embodiment, the transfer layer of the thermal transfer sheet according to the present disclosure includes an adhesive layer.

The adhesive layer contains at least one thermoplastic resin that softens and exhibits adhesiveness upon heating.

The thermoplastic resin may be a polyester, a vinyl resin, a (meth)acrylic resin, a (meth)acrylic resin, a polyurethane, a cellulose resin, a polyamide, a polyolefin, a polystyrene, or a chlorinated resin thereof.

The adhesive layer may contain the additive material.

The adhesive layer preferably has a thickness in the range of 0.1 to 2 μm.

The adhesive layer can be formed by applying a coating liquid prepared by dispersing or dissolving the above materials in water or an appropriate solvent to the peeling layer or the like by the known means to form a coating film and drying the coating film.

(Coloring Layer)

In one embodiment, the thermal transfer sheet according to the present disclosure includes a coloring layer containing a coloring material on the first substrate in a frame sequential manner with the transfer layer. The thermal transfer sheet may include a plurality of coloring layers.

The coloring layer may be a sublimation transfer coloring layer in which only a sublimation dye is transferred or may be a melt transfer coloring layer in which the coloring layer itself is transferred.

The coloring layer contains at least one coloring material. The coloring material may be a pigment or a dye. The dye may also be a sublimation dye.

Examples of the coloring material include carbon black, acetylene black, lampblack, graphite, iron black, aniline black, silica, calcium carbonate, titanium oxide, cadmium red, cadmopone red, chromium red, vermilion, colcothar, azo pigments, alizarin lake, quinacridone, cochineal lake perylene, yellow ochre, aureolin, cadmium yellow, cadmium orange, chromium yellow, zinc yellow, Naples yellow, nickel yellow, azo pigments, greenish yellow, ultramarine, mountain blue, cobalt, phthalocyanine, anthraquinone, indigoid, cinnabar green, cadmium green, chromium green, phthalocyanine, azomethine, perylene, and aluminum pigments; and sublimation dyes, such as diarylmethane dyes, triarylmethane dyes, thiazole dyes, merocyanine dyes, pyrazolone dyes, methine dyes, indoaniline dyes, acetophenone azomethine dyes, pyrazoloazomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

In one embodiment, the coloring layer contains a resin material. The resin material may be a polyester, a polyamide, a polyolefin, a vinyl resin, a (meth)acrylic resin, a cellulose resin, a styrene resin, a polycarbonate, a butyral resin, a phenoxy resin, or an ionomer resin.

The coloring layer may contain the additive material.

The coloring layer preferably has a thickness in the range of 0.1 to 3 μm.

The coloring layer can be formed by applying a coating liquid prepared by dispersing or dissolving the above materials in water or an appropriate solvent to the first substrate by the known means to form a coating film and drying the coating film.

(Release Layer)

In one embodiment, the thermal transfer sheet according to the present disclosure includes a release layer between the first substrate and the transfer layer. This can improve the transferability of the thermal transfer sheet.

In one embodiment, the release layer contains a resin material. The resin material may be a (meth)acrylic resin, a polyurethane, a polyamide, a polyester, a melamine resin, a polyol resin, a cellulose resin, or a silicone resin.

In one embodiment, the release layer contains a release material, such as silicone oil, a phosphate plasticizing material, a fluorinated compound, a wax, a metallic soap, or a filler.

The release layer preferably has a thickness in the range of 0.2 to 2 μm.

The release layer can be formed by applying a coating liquid prepared by dispersing or dissolving the above materials in water or an appropriate solvent to the first substrate or the like by the known means to form a coating film and drying the coating film.

(Second Peeling Layer)

In one embodiment, the thermal transfer sheet according to the present disclosure includes a second peeling layer between the melt transfer coloring layer and the first substrate.

The second peeling layer contains a resin material. The resin material may be a polyester, a polyamide, a polyolefin, a vinyl resin, a (meth)acrylic resin, an imide resin, a cellulose resin, a styrene resin, a polycarbonate, or an ionomer resin.

The resin material content of the second peeling layer preferably ranges from 50% to 95% by mass, more preferably 70% to 90% by mass. This can improve the transferability of the coloring layer.

The second peeling layer may contain an additive material, such as a filler, a plasticizing material, an ultraviolet absorbing material, inorganic particles, organic particles, a release material, or a dispersing material.

The peeling layer preferably has a thickness in the range of 0.5 to 5 μm, more preferably 0.5 to 3 μm. This can improve the transferability of the coloring layer.

The peeling layer can be formed by applying a coating liquid prepared by dispersing or dissolving the above materials in water or an appropriate solvent to the first substrate or the like by the known means to form a coating film and drying the coating film.

(Back Layer)

In one embodiment, the thermal transfer sheet according to the present disclosure includes a back layer on a surface of the first substrate on which the transfer layer is not formed. This can prevent sticking, wrinkling, and the like due to heating during thermal transfer.

In one embodiment, the back layer contains a resin material. The resin material may be a cellulose resin, a styrene resin, a vinyl resin, a polyester, a polyurethane, a silicone-modified polyurethane, a fluorine-modified polyurethane, or a (meth)acrylic resin.

In one embodiment, the back layer contains, as a resin material, a two-component curable resin that can be cured with an isocyanate compound or the like. Such a resin may be a poly(vinyl acetal), such as poly(vinyl acetoacetal) or poly(vinyl butyral).

In one embodiment, the back layer contains inorganic or organic particles. This can further prevent sticking, wrinkling, and the like due to heating during thermal transfer.

The inorganic particles may be a clay mineral, such as talc or kaolin, a carbonate, such as calcium carbonate or magnesium carbonate, a hydroxide, such as aluminum hydroxide or magnesium hydroxide, a sulfate, such as calcium sulfate, an oxide, such as silica, graphite, niter, or boron nitride.

The organic particles may be organic resin particles formed of a (meth)acrylic resin, a Teflon (registered trademark) resin, a silicone resin, a lauroyl resin, a phenolic resin, an acetal resin, a styrene resin, a polyamide, or the like, cross-linked resin particles formed by reacting one of these resins with a cross-linking material, or the like.

The back layer preferably has a thickness in the range of 0.1 to 2 μm, more preferably 0.1 to 1 μm. This can prevent sticking, wrinkling, and the like while maintaining thermal energy transfer during thermal transfer.

The back layer can be formed by applying a coating liquid prepared by dispersing or dissolving the above materials in water or an appropriate solvent to the first substrate by the known means to form a coating film and drying the coating film.

(Intermediate Transfer Medium)

Figure 4:
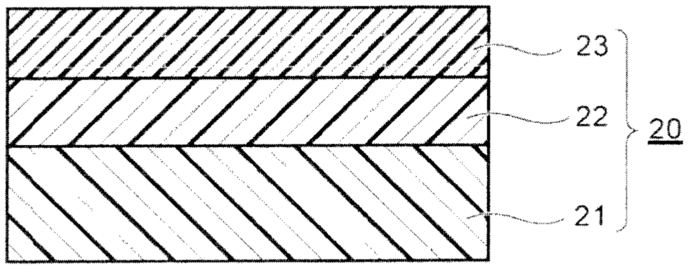
FIG. 4 is a schematic cross-sectional view of an embodiment of an intermediate transfer medium according to the present disclosure.

As illustrated in FIG. 4, an intermediate transfer medium 20 according to the present disclosure includes a second substrate 21, a peeling layer 22, and a receiving layer 23.

In one embodiment, the intermediate transfer medium 20 may include a protective layer (not shown in the figure) between the peeling layer 22 and the receiving layer 23. In one embodiment, the intermediate transfer medium 20 may include an intermediate layer (not shown in the figure) between the protective layer and the peeling layer.

Each layer of the intermediate transfer medium according to the present disclosure is described below.

(Second Substrate)

The second substrate may be a material that can be used for the first substrate.

(Peeling Layer)

The intermediate transfer medium includes a peeling layer containing a resin material and antimicrobial particles.

A preferred structure of the peeling layer is the same as that of the thermal transfer sheet and is not described here.

(Receiving Layer)

The receiving layer is a layer for receiving a sublimation dye transferred from a dye layer of the thermal transfer sheet and maintaining a formed image, and contains at least one resin material. The resin material may be an epoxy resin, a polyester, a polyamide, a polyolefin, a vinyl resin, a (meth) acrylic resin, an imide resin, a cellulose resin, a styrene resin, a polycarbonate, or an ionomer resin.

The resin material content of the receiving layer preferably ranges from 80% to 98% by mass.

In one embodiment, the receiving layer contains one or two or more types of release materials. This can improve releasability from the thermal transfer sheet after image formation.

The release material may be a solid wax, such as a polyethylene wax or an amide wax, a fluorinated surface-active material, a phosphate surface-active material, a silicone oil, a reactive silicone oil, a curable silicone oil, or a silicone resin.

The release material content of the receiving layer preferably ranges from 0.5% to 20% by mass, more preferably 0.5% to 10% by mass. This can further improve releasability from the thermal transfer sheet after image formation.

The receiving layer may contain the additive material.

The receiving layer preferably has a thickness in the range of 0.5 to 20 μm.

The receiving layer can be formed by applying a coating liquid prepared by dispersing or dissolving the above materials in water or an appropriate solvent to the peeling layer or the like by the known means to form a coating film and drying the coating film.

(Protective Layer)

In one embodiment, the intermediate transfer medium according to the present disclosure includes a protective layer between the peeling layer and the receiving layer.

The protective layer contains a resin material. The resin material may be a polyester, a (meth)acrylic resin, an epoxy resin, a styrene resin, a polyurethane, an ionizing radiation curable resin, or an ultraviolet absorbing resin. Among these, a polyester is preferred in terms of the durability of a printed material to be produced and foil cutting properties.

In the present disclosure, the polyester preferably has a Tg in the range of 50° C. to 80° C., more preferably 55° C. to 70° C. This can further improve the durability of a printed material to be produced and improve foil cutting properties and the prevention of transport wrinkling.

The polyester preferably has a number-average molecular weight (Mn) in the range of 2,000 to 25,000, more preferably 8,000 to 20,000. This can further improve the durability of the intermediate transfer medium and improve foil cutting properties.

In the present disclosure, the Mn of resin refers to a value measured by gel permeation chromatography using a standard polystyrene and is measured by a method according to JIS K 7252-1.

The polyester content of the protective layer preferably ranges from 50% to 99.5% by mass, more preferably 70% to 98% by mass. This can further improve the durability of a printed material to be produced and improve foil cutting properties and the prevention of transport wrinkling.

In one embodiment, the protective layer contains a filler. The filler may be an organic filler, an inorganic filler, or a combination thereof.

The organic filler may be particles (resin particles) formed of a resin, such as a melamine resin, a benzoguanamine resin, a (meth)acrylic resin, a polyamide, a fluororesin, a phenolic resin, a styrene resin, a polyolefin, a silicone resin, or a copolymer of monomers constituting these resins. Among these, particles formed of a (meth)acrylic resin are particularly preferred in terms of durability.

The inorganic filler may be a clay mineral, such as talc or kaolin, a carbonate, such as calcium carbonate or magnesium carbonate, a hydroxide, such as aluminum hydroxide or magnesium hydroxide, a sulfate, such as calcium sulfate, an oxide, such as silica, graphite, niter, or boron nitride.

The filler may have a surface treated with a surface treatment material, such as a silane coupling agent.

The filler preferably has an average particle size of 3.8 μm or less, more preferably 3.5 μm or less. This can improve the prevention of transport wrinkling of the intermediate transfer medium.

In the present disclosure, the average particle size refers to a volume-average particle size, which is measured in accordance with JIS Z 8819-2.

The filler content of the protective layer preferably ranges from 0.5% to 5% by mass, more preferably 0.7% to 4.7% by mass, still more preferably 1% to 4.5% by mass. This can improve the prevention of transport wrinkling of the intermediate transfer medium.

The protective layer may contain another resin material, such as a polyester with a Tg of less than 45° C., a polyamide, a polyolefin, a vinyl resin, a poly(vinyl acetal), a (meth)acrylic resin, an imide resin, a cellulose resin, a styrene resin, a polycarbonate, or an ionomer resin, and the above additive material.

The protective layer preferably has a thickness in the range of 0.5 to 4.5 μm, more preferably 1 to 3 μm. This can further improve the durability of a printed material to be produced.

The protective layer can be formed by applying a coating liquid prepared by dispersing or dissolving the above materials in water or an appropriate solvent to the peeling layer or the like by the known means to form a coating film and drying the coating film.

(Intermediate Layer)

In one embodiment, the intermediate transfer medium includes an intermediate layer between the protective layer and the peeling layer. This can further improve the durability of a printed material to be produced.

In one embodiment, the intermediate layer contains a resin material. The resin material may be a polyester, a (meth)acrylic resin, an epoxy resin, a styrene resin, a polyurethane, an ionizing radiation curable resin, or an ultraviolet absorbing resin.

In a preferred embodiment, the intermediate layer contains at least one (meth)acrylic polyol resin with a glass transition temperature (Tg) of 80° C. or more. The (meth) acrylic polyol resin preferably has a Tg in the range of 80° C. to 110° C., more preferably 85° C. to 105° C. This can further improve the durability of the intermediate transfer medium.

In the present disclosure, the (meth)acrylic polyol resin refers to a resin containing at least one (meth)acrylate with a hydroxy group as a polymerization component.

Examples of the (meth)acrylate with a hydroxy group include 2-hydroxyethyl (meth)acrylate, 3-hydroxypropyl (meth)acrylate, 2-hydroxybutyl (meth)acrylate, and 2-hydroxy-3-phenoxypropyl (meth)acrylate.

The amount of the (meth)acrylate with a hydroxy group in the (meth)acrylic polyol resin is preferably 8% by mass or more, more preferably 10% by mass or more, of the total constitutional units. This can further improve the durability of the intermediate transfer medium.

The (meth)acrylic polyol resin may contain one or two or more types of monomers other than the (meth)acrylates as polymerization components. Examples of the polymerization component include alkyl (meth)acrylates, such as methyl (meth)acrylate, ethyl (meth)acrylate, butyl (meth) acrylate, 2-ethylhexyl (meth)acrylate, and octyl (meth)acrylate, styrene, α-methylstyrene, vinyltoluene, acrylamide, methacrylamide, vinyl acetate, and maleic anhydride.

The (meth)acrylic polyol resin preferably has a hydroxyl value in the range of 10 to 100 mgKOH/g. This can further improve the durability of the intermediate transfer medium, improve foil cutting properties, and prevent tailing and the like.

In the present disclosure, the "hydroxyl value" of the (meth)acrylic polyol resin refers to the milligrams of potassium hydroxide required to acetylate hydroxy groups in 1 g of the (meth)acrylic polyol resin. The hydroxyl value can be determined in accordance with JIS K 0070 by preparing a pyridine solution of a (meth)acrylic polyol resin, the solution containing acetic anhydride, acetylating hydroxy groups, hydrolyzing an excess acetylation reagent with water, and titrating the resulting acetic acid with potassium hydroxide.

The (meth)acrylic polyol resin preferably has a weight-average molecular weight (Mw) in the range of 8,000 to 70,000, more preferably 10,000 to 50,000. This can further improve the durability of the intermediate transfer medium and improve foil cutting properties.

In the present disclosure, the Mw of resin refers to a value measured by gel permeation chromatography using a standard polystyrene and is measured by a method according to JIS K 7252-1.

The (meth)acrylic polyol resin is preferably a cured (meth)acrylic polyol resin produced by curing a (meth) acrylic polyol resin with a Tg of 80° C. or more using a curing material. This can further improve the durability of the intermediate transfer medium.

Examples of the curing material include aliphatic amine compounds, alicyclic amine compounds, aromatic amine compounds, metal chelate materials, such as titanium chelate materials, zirconium chelate materials, and aluminum chelate materials, acid anhydrides, and isocyanate compounds.

When the curing material is an isocyanate compound, the molar equivalent ratio (—NCO/—OH) of the isocyanate group of the compound to the hydroxy group of the (meth) acrylic polyol resin preferably ranges from 0.2 to 3, more preferably 0.3 to 2. This can improve foil cutting properties.

The (meth)acrylic polyol resin content of the intermediate layer preferably ranges from 50% to 99% by mass, more preferably 70% to 95% by mass. This can further improve the durability of the intermediate transfer medium and improve foil cutting properties.

The intermediate layer may contain the additive material.

The intermediate layer preferably has a thickness in the range of 0.5 to 5 μm, more preferably 1 to 4 μm. This can further improve the durability of the intermediate transfer medium and improve foil cutting properties.

The intermediate layer can be formed by applying a coating liquid prepared by dispersing or dissolving the above materials in water or an appropriate solvent to the peeling layer by the known means to form a coating film and drying the coating film.

(Printed Material)

Figure 5:
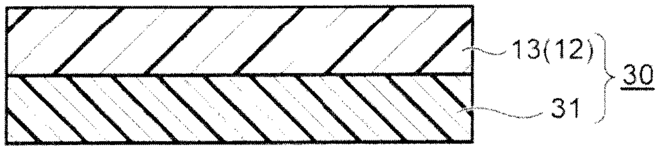
FIG. 5 is a schematic cross-sectional view of an embodiment of a printed material according to the present disclosure.

In one embodiment, a printed material 30 according to the present disclosure is produced using the thermal transfer sheet and, as illustrated in FIG. 5, includes a transfer-receiving article 31 and the transfer layer 13 including the peeling layer 12.

Figure 6:
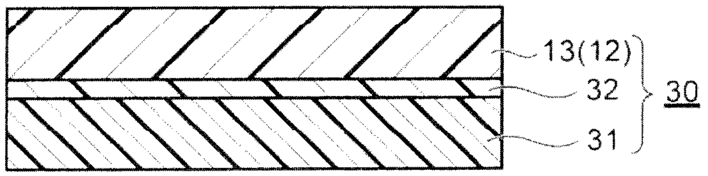
FIG. 6 is a schematic cross-sectional view of an embodiment of a printed material according to the present disclosure.

The transfer-receiving article 31 may be composed only of a substrate 32, as illustrated in FIG. 5, or may be composed of the substrate 32 and a receiving layer 33, as illustrated in FIG. 6.

(Substrate for Transfer-Receiving Article)

The substrate for the transfer-receiving article may be a paper substrate, such as high-quality paper, art paper, coated paper, natural fiber paper, tracing paper, resin coated paper, cast-coated paper, paperboard, synthetic paper, or impregnated paper, a card substrate for use in the field of ID cards and IC cards, glass, metal, ceramic, wood, cloth, or the like.

Examples of the card substrate include resin sheets formed of poly(vinyl chloride) resins, vinyl chloride-vinyl acetate copolymers, polycarbonates, polyester resins, and the like; and metal sheets. The thickness of the card substrate depends on the intended use of the finally formed printed material.

The substrate for the transfer-receiving article preferably has a thickness in the range of 30 to 900 μm.

(Receiving Layer)

In one embodiment, as illustrated in FIG. 6, the transfer-receiving article 31 may include the receiving layer 33 on the substrate 32. A preferred structure of the receiving layer is the same as that of the intermediate transfer medium and is not described here.

The receiving layer may have an image formed thereon.

The receiving layer preferably has a thickness in the range of 1 to 10 μm.

(Transfer Layer)

The composition and thickness of the transfer layer in a printed material are described above and are not described here.

The area ratio (protrusion area ratio) of protrusions of antimicrobial particles in the peeling layer of a printed material preferably ranges from 0.05% to 3%, more preferably 0.1% to 1%. This can improve the antimicrobial properties of the printed material.

In the present disclosure, the protrusion area ratio of antimicrobial particles in the peeling layer can be calculated by observing the peeling layer of a printed material with a non-contact surface measuring apparatus VertScan (manufactured by Ryoka Systems Inc.) utilizing an optical coherence system, and calculating the ratio of the surface area of exposed antimicrobial particles to the total observed area.

Figure 7:
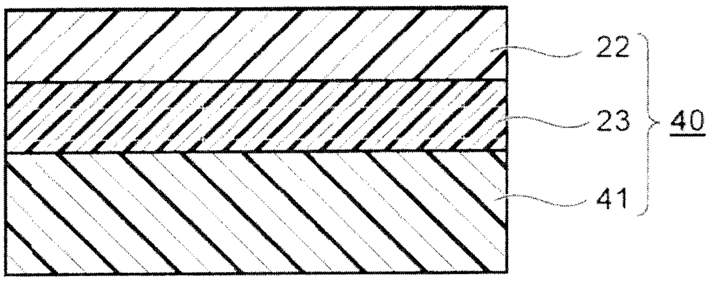
FIG. 7 is a schematic cross-sectional view of an embodiment of a printed material according to the present disclosure.

In one embodiment, a printed material 40 according to the present disclosure is produced using the intermediate transfer medium and, as illustrated in FIG. 7, includes a substrate (transfer-receiving article) 41, the receiving layer 23, and the peeling layer 22.

In one embodiment, the printed material 40 includes a protective layer (not shown in the figure) between the receiving layer 23 and the peeling layer 22.

The substrate for the transfer-receiving article, the receiving layer, the peeling layer, and the protective layer of a printed material produced using the intermediate transfer medium are described in detail above and are not described here.

(Method for Producing Printed Material)

In one embodiment, a method for producing a printed material according to the present disclosure includes the steps of:

providing the thermal transfer sheet and a transfer-receiving article; and transferring the transfer layer of the thermal transfer sheet onto the transfer-receiving article.

In one embodiment, the method for producing a printed material according to the present disclosure includes the step of irradiating the transfer-receiving article with bactericidal rays after the transfer of the transfer layer.

In one embodiment, the method for producing a printed material according to the present disclosure further includes the step of forming an image on the transfer-receiving article before the transfer of the transfer layer.

(Step of Providing Thermal Transfer Sheet and Transfer-Receiving Article)

A method for producing the thermal transfer sheet is described above and is not described here.

The transfer-receiving article may be a commercially available article. The substrate for the transfer-receiving article may also be produced by a T-die method, an inflation method, or the like. Alternatively, the transfer-receiving article may also be produced by applying a coating liquid for forming a receiving layer to a substrate and drying the coating liquid. Alternatively, a laminate produced by dry-laminating substrates made of a different material may also be used.

(Transfer Step of Transfer Layer)

The method for producing a printed material according to the present disclosure includes the step of transferring the transfer layer from the thermal transfer sheet. The transfer layer is preferably transferred after image formation on a transfer-receiving article.

(Step of Irradiation with Bactericidal Rays)

In one embodiment, the method for producing a printed material according to the present disclosure includes the step of irradiating the transfer-receiving article with bactericidal rays after the transfer of the transfer layer.

In one embodiment, the transfer-receiving article is irradiated with bactericidal rays from a germicidal lamp placed near a discharge port of a thermal transfer printer.

Examples of light sources usable as germicidal lamps include high-pressure mercury lamps, ultraviolet fluorescent lamps, and xenon lamps.

(Image Formation Step)

In one embodiment, the method for producing a printed material according to the present disclosure further includes the step of forming an image on the transfer-receiving article before the transfer of the transfer layer. When the thermal transfer sheet according to the present disclosure includes a coloring layer in a frame sequential manner with the transfer layer, the image may be formed using the thermal transfer sheet or a different thermal transfer sheet.

(Method for Producing Printed Material)

In one embodiment, a method for producing a printed material according to the present disclosure includes the steps of:

providing the intermediate transfer medium and a transfer-receiving article;

forming an image on the receiving layer of the intermediate transfer medium; and transferring the peeling layer and the receiving layer of the intermediate transfer medium onto the transfer-receiving article.

In one embodiment, the method for producing a printed material according to the present disclosure includes the step of irradiating the transfer-receiving article with bactericidal rays after the transfer of the peeling layer and the receiving layer.

(Step of Providing Intermediate Transfer Medium and Transfer-Receiving Article)

A method for producing an intermediate transfer medium is described above and is not described here.

The transfer-receiving article may be produced by the above method or may be commercially available.

(Image Formation Step)

The method for producing a printed material according to the present disclosure includes the step of forming an image on the receiving layer of the intermediate transfer medium.

The image can be formed on the receiving layer by a known method, for example, by using a thermal transfer sheet including a coloring layer.

(Step of Transferring Peeling Layer and Receiving Layer)

The method for producing a printed material according to the present disclosure includes the step of transferring the peeling layer and the receiving layer from the intermediate transfer medium onto the transfer-receiving article. For an intermediate transfer medium including a protective layer between the peeling layer and the receiving layer, the protective layer may also be transferred.

(Step of Irradiation with Bactericidal Rays)

This step is described above and is not described here.

(Printed Material Production System)

A printed material production system according to the present disclosure includes a thermal transfer printer and a sterilization mechanism.

(Thermal Transfer Printer)

The thermal transfer printer of the printed material production system according to the present disclosure may be any thermal transfer printer that can transport the thermal transfer sheet or the intermediate transfer medium and can produce the printed material, and may be a known thermal transfer printer.

(Sterilization Mechanism)

The sterilization mechanism may be a germicidal lamp, which can be placed near a discharge port of the thermal transfer printer.

The present disclosure relates to the following [1] to [13], for example.

[1]

A thermal transfer sheet including:

a first substrate; and a transfer layer including at least a peeling layer, the peeling layer containing a resin material and antimicrobial particles, the antimicrobial particles having an average particle size in the range of 1 to 8 μm, and the peeling layer having a content of the antimicrobial particles in the range of 2.8 to 8 parts by mass per 100 parts by mass of the resin material.

[2]

The thermal transfer sheet according to [1], wherein the peeling layer has a thickness in the range of 0.5 to 5 μm.

[3]

The thermal transfer sheet according to [1] or [2], wherein the ratio of the average particle size of the antimicrobial particles to the thickness of the peeling layer (the average particle size of the antimicrobial particles/the thickness of the peeling layer) ranges from 1 to 8.

[4]

The thermal transfer sheet according to any one of [1] to [3], wherein the antimicrobial particles are a phosphate on which antimicrobial metal ions are supported.

[5]

The thermal transfer sheet according to any one of [1] to [4], wherein the peeling layer contains an antistatic material.

[6]

A printed material produced using the thermal transfer sheet according to any one of [1] to [5], including:

a transfer-receiving article; and the transfer layer.

[7]

A method for producing the printed material according to [6], including the steps of:

providing the thermal transfer sheet according to any one of [1] to [5] and a transfer-receiving article; and transferring the transfer layer of the thermal transfer sheet onto the transfer-receiving article.

[8]

The method for producing the printed material according to [7], further including the step of irradiating the transfer-receiving article with bactericidal rays after transfer of the transfer layer.

[9]

An intermediate transfer medium including a second substrate, a peeling layer, and a receiving layer, the peeling layer containing a resin material and antimicrobial particles, the antimicrobial particles having an average particle size in the range of 1 to 8 μm, and the peeling layer having a content of the antimicrobial particles in the range of 2.8 to 8 parts by mass per 100 parts by mass of the resin material.

[10]

A printed material produced using the intermediate transfer medium according to [9], including a transfer-receiving article, the peeling layer, and the receiving layer.

[11]

A method for producing the printed material according to [10], including the steps of:

providing the intermediate transfer medium according to [9] and a transfer-receiving article;

forming an image on the receiving layer of the intermediate transfer medium; and transferring the peeling layer and the receiving layer of the intermediate transfer medium onto the transfer-receiving article.

[12]

The method for producing the printed material according to [11], including the step of irradiating the transfer-receiving article with bactericidal rays after transfer of the peeling layer and the receiving layer.

[13]

A printed material production system for producing the printed material according to [6] or [10], including:

a thermal transfer printer; and a sterilization mechanism.

EXAMPLES

Although the present disclosure is further described in the following examples, the present disclosure is not limited to these examples.

Example 1

A PET film with a thickness of 4.5 μm was provided as a first substrate. Coating liquids A, B, and C with the following compositions for forming a coloring layer were applied to one surface of the PET film in a frame sequential manner and were dried to form coloring layers A to C with a thickness of 0.7 μm, respectively.

<Coating Liquid A for Forming Coloring Layer>

| | |
|---|---|
| Disperse Yellow 201 | 4 parts by mass |
| Poly(vinyl acetal) | 3.5 parts by mass (S-Lec (registered trademark) KS-5, manufactured by Sekisui Chemical Co., Ltd.) |
| Polyethylene wax | 0.1 parts by mass |
| Methyl ethyl ketone (MEK) | 45 parts by mass |
| Toluene | 45 parts by mass |

<Coating Liquid B for Forming Coloring Layer>

| | |
|---|---|
| Disperse Red 60 | 1.5 parts by mass |
| Disperse Violet 26 | 2 parts by mass |
| Poly(vinyl acetal) | 4.5 parts by mass (S-Lec (registered trademark) KS-5, manufactured by Sekisui Chemical Co., Ltd.) |
| Polyethylene wax | 0.1 parts by mass |
| MEK | 45 parts by mass |
| Toluene | 45 parts by mass |

<Coating Liquid C for Forming Coloring Layer>

| | |
|---|---|
| Solvent Blue 63 | 4 parts by mass |
| Poly(vinyl acetal) | 3.5 parts by mass (S-Lec (registered trademark) KS-5, manufactured by Sekisui Chemical Co., Ltd.) |
| Polyethylene wax | 0.1 parts by mass |
| MEK | 45 parts by mass |
| Toluene | 45 parts by mass |

A coating dispersion liquid with the following composition for forming a peeling layer was applied in a frame sequential manner with the coloring layers thus formed and was dried to form a peeling layer with a thickness of 1 μm.

<Coating Liquid for Forming Peeling Layer>

| | |
|---|---|
| (Meth)acrylic resin | 100 parts by mass (Thermolac Lp-45M-30, Tg 105° C., manufactured by Soken Chemical & Engineering Co., Ltd.) |
| Antimicrobial particles A | 3 parts by mass (Bactekiller (registered trademark) BM-102NSC, average particle size 2 μm, silver ion and zinc ion-supported phosphate, manufactured by Fuji Chemical) |
| MEK | 250 parts by mass |
| Toluene | 250 parts by mass |

A coating liquid with the following composition for forming an adhesive layer was applied to the peeling layer thus formed and was dried to form an adhesive layer with a thickness of 1 μm.

<Coating Liquid for Forming Adhesive Layer>

| | |
|---|---|
| Polyester | 10 parts by mass (Vylon (registered trademark) 226, Tg 65° C., Mn 8,000, manufactured by Toyobo Co., Ltd.) |
| Ultraviolet absorbing acrylic resin | 10 parts by mass (PUVA-50M-40TM, solid content 40%, manufactured by Otsuka Chemical Co., Ltd.) |
| MEK | 40 parts by mass |
| Toluene | 40 parts by mass |

A coating liquid with the following composition for forming a back layer was applied to the other surface of the PET film and was dried to form a back layer with a thickness of 1 μm. Thus, a thermal transfer sheet was formed.

<Coating Liquid for Forming Back Layer>

| | |
|---|---|
| Poly(vinyl butyral) | 2 parts by mass (S-Lec (registered trademark) BX-1, manufactured by Sekisui Chemical Co., Ltd.) |
| Polyisocyanate | 9.2 parts by mass (Burnock (registered trademark) D750, manufactured by DIC Corporation) |
| Phosphate surfactant | 1.3 parts by mass (Plysurf (registered trademark) A208N, manufactured by Dai-ichi Kogyo Seiyaku Co., Ltd.) |
| Talc | 0.3 parts by mass (Micro Ace (registered trademark) P-3, manufactured by Nippon Talc Co., Ltd.) |
| Toluene | 43.6 parts by mass |
| MEK | 43.6 parts by mass |

Examples 2 to 7 and Comparative Examples 1 to 4

Thermal transfer sheets were formed in the same manner as in Example 1 except that the structure and thickness of the peeling layer were changed as shown in Table 1.

The components in Table 1 are described in detail below.

Antimicrobial particles B: Bactekiller (registered trademark) BM-102GA(IZ), average particle size 5 μm, silver ion and zinc ion-supported phosphate, manufactured by Fuji Chemical Antimicrobial particles C: Bactekiller (registered trademark) BM-45M-30, average particle size 10 μm, silver ion and zinc ion-supported phosphate, manufactured by Fuji Chemical

Example 8

A thermal transfer sheet was formed in the same manner as in Example 1 except that a coating liquid with the following composition for forming a peeling layer was used.

<Coating Liquid for Forming Peeling Layer>

| | |
|---|---|
| (Meth)acrylic resin | 100 parts by mass (Thermolac Lp-45M-30, Tg 105° C., manufactured by Soken Chemical & Engineering Co., Ltd.) |
| Antimicrobial particles A | 3 parts by mass (BM-102NSC, average particle size 2 μm, manufactured by Fuji Chemical) |
| Antistatic material | 5 parts by mass (Acrit (registered trademark) 1SX-1071I, (meth)acrylate resin containing quaternary ammonium salt, manufactured by Taisei Fine Chemical Co., Ltd.) |
| MEK | 250 parts by mass |
| Toluene | 250 parts by mass |

Example 9

A thermal transfer sheet was formed in the same manner as in Example 8 except that the structure of the peeling layer was changed as shown in Table 1.

Example 10

A PET film (Lumirror (registered trademark) 12F65K, manufactured by Toray Industries, Inc.) with a thickness of 12 μm was provided as a second substrate. A coating liquid with the following composition for forming a peeling layer was applied to one surface of the PET film and was dried to form a peeling layer with a thickness of 1 μm.

<Coating Liquid for Forming Peeling Layer>

| | |
|---|---|
| (Meth)acrylic resin | 80 parts by mass (Dianal (registered trademark) BR-87, Tg 105° C., Mw 25,000, manufactured by Mitsubishi Chemical Corporation) |
| Polyester | 5 parts by mass (Vylon (registered trademark) 200, manufactured by Toyobo Co., Ltd.) |
| Antimicrobial particles A | 3 parts by mass (BM-102NSC, average particle size 2 μm, manufactured by Fuji Chemical) |
| Antistatic material | 5 parts by mass (Acrit (registered trademark) 1SX-1071I, (meth)acrylate resin containing quaternary ammonium salt, manufactured by Taisei Fine Chemical Co., Ltd.) |
| Polyethylene wax | 5 parts by mass (Polywax 1000, manufactured by Toyo ADL Corporation) |
| Toluene | 192.5 parts by mass |
| MEK | 192.5 parts by mass |

A coating liquid with the following composition for forming an intermediate layer was applied to the peeling layer and was dried to form an intermediate layer with a thickness of 2 μm.

<Coating Liquid for Forming Intermediate Layer>

| | |
|---|---|
| (Meth)acrylic polyol resin | 100 parts by mass (6KW-700, solid content 36.5%, Tg 102° C., Mw 55,000, hydroxyl value 30.1, manufactured by Taisei Fine Chemical Co., Ltd.) |
| Isocyanate compound | 3.6 parts by mass (Takenate (registered trademark) D110N, solid content 75%, manufactured by Mitsui Chemicals, Inc.) |
| MEK | 92 parts by mass |

A coating liquid with the following composition for forming a protective layer was applied to the intermediate layer and was dried to form a protective layer with a thickness of 2 μm.

<Coating Liquid for Forming Protective Layer>

| | |
|---|---|
| Polyester | 78.4 parts by mass (Vylon (registered trademark) 200, Tg 67° C., Mn 17,000, manufactured by Toyobo Co., Ltd.) |
| Filler | 1.6 parts by mass (Epostar (registered trademark) MA1002, average particle size 2 μm, (meth)acrylic resin particles, manufactured by Nippon Shokubai Co., Ltd.) |
| MEK | 20 parts by mass |

A coating liquid with the following composition for forming a receiving layer was applied to the intermediate layer and was dried to form a receiving layer with a thickness of 2 μm. Thus, an intermediate transfer medium was formed.

<Coating Liquid for Forming Receiving Layer>

| | |
|---|---|
| Vinyl chloride-vinyl acetate copolymer | 95 parts by mass (Solbin (registered trademark) CNL, manufactured by Nissin Chemical Industry Co., Ltd.) |
| Epoxy-modified silicone oil | 5 parts by mass (KP-1800U, manufactured by Shin-Etsu Chemical Co., Ltd.) |
| Toluene | 200 parts by mass |
| MEK | 200 parts by mass |

<<Evaluation of Antimicrobial Properties>>

Using the coloring layers of the thermal transfer sheets formed in Examples 1 to 9 and Comparative Examples 1 to 4 and the following thermal transfer printer, a black image (image gray level 0/255) was formed on a PVC card (manufactured by Dai Nippon Printing Co., Ltd., 5 cm in width×7 cm in length) used as a transfer-receiving article.

The transfer layers of the thermal transfer sheets formed in the examples and comparative examples were transferred onto the image with the following thermal transfer printer to obtain printed materials.

(Thermal Transfer Printer)

Thermal head: KEE-57-12GAN2-STA, manufactured by Kyocera Corporation

Average resistance of heating element: 3303 Ω

Resolution in main scanning direction: 300 dot per inch (dpi)

Resolution in sub-scanning direction: 300 dpi

Line speed: 3.0 milliseconds/line

Print initial temperature: 35° C.

Pulse duty ratio: 70%

Using the intermediate transfer medium formed in Example 10, the thermal transfer sheet formed in Example 1, and the thermal transfer printer, a sublimation dye was transferred from the coloring layers A to C of the thermal transfer sheet onto the receiving layer of the intermediate transfer medium to form a black image (image gray level 0/255).

The PVC card was provided. The transfer layer including the receiving layer on which the image was formed was transferred from the intermediate transfer medium onto the PVC card using a card laminator to obtain a printed material.

The antimicrobial properties of the printed material were evaluated in accordance with JIS Z 2801 (a film adhesion method).

More specifically, a bacterial suspension containing 105 cells of *Escherichia coli* was added dropwise onto the surface of the transfer layer of the printed material, and a PE film was brought into close contact with the surface and was allowed to stand at 35° C. for 24 hours.

After standing, the bacterial cells adhering to the PE film and the laminate were washed out with the SCDLP culture medium. The washing liquid was collected, was transferred to a laboratory dish, and was cultured at 35° C. for 45 hours. The number of viable cells of *Escherichia coli* was counted.

An antimicrobial activity value was determined using the following formula (1) and was rated in accordance with the following evaluation criteria. In the formula (1), x denotes the viable cell count of *Escherichia coli* on a printed material produced using the thermal transfer sheet including the peeling layer without antimicrobial particles formed in Comparative Example 1, and y denotes the viable cell count of *Escherichia coli* on a printed material produced using each of the thermal transfer sheets formed in Examples 1 to 9 and Comparative Examples 2 to 4 and the intermediate transfer medium formed in Example 10. Table 1 summarizes the evaluation results.

$$\text{Antimicrobial activity value} = \log x/y \quad (1)$$

(Evaluation Criteria)

A: The antimicrobial activity value was 2.7 or more.

B: The antimicrobial activity value was 2 or more and less than 2.7.

NG: The antimicrobial activity value was less than 2.

<<Evaluation of Foil Adherence>>

The thermal transfer sheets formed in the examples and comparative examples (the intermediate transfer medium in Example 10) were folded once in the longitudinal direction and once in the transverse direction at a portion in which the transfer layer was formed, and were allowed to stand. After standing, the sheets were unfolded, were visually observed, and were rated in accordance with the following evaluation criteria. Table 1 summarizes the evaluation results.

(Evaluation Criteria)

A: The foil delamination of the transfer layer was less than 4 $mm^2$.

B: The foil delamination of the transfer layer was 4 $mm^2$ or more and less than 10 $mm^2$.

NG: The foil delamination of the transfer layer was 10 $mm^2$ or more.

<<Evaluation of Plasticizing Material Resistance>>

Each printed material obtained in the evaluation of antimicrobial properties was superposed on a soft vinyl chloride sheet containing a plasticizing material (Artoron (registered trademark) #480, thickness 400 μm, manufactured by Mitsubishi Chemical Corporation) such that the transfer layer of the printed material faced the soft vinyl chloride sheet containing the plasticizing material, and was allowed to stand at 50° C. for 12 hours under a load of 24 g/$cm^2$.

After standing, the soft vinyl chloride sheets containing the plasticizing material were visually observed and were rated in accordance with the following evaluation criteria. Table 1 summarizes the evaluation results.

(Evaluation Criteria)

A: No dye was transferred to the soft vinyl chloride sheet containing the plasticizing material, indicating high plasticizing material resistance.

B: A little dye was transferred to the soft vinyl chloride sheet containing the plasticizing material without practical problems.

C: A large amount of dye was transferred to the soft vinyl chloride sheet containing the plasticizing material.

<<Measurement of Protrusion Area Ratio of Antimicrobial Particles>>

In the printed materials formed in the evaluation of antimicrobial properties, the peeling layer of each printed material was observed with the non-contact surface measuring apparatus VertScan (manufactured by Ryoka Systems Inc.) utilizing the optical coherence system, and the ratio of the surface area of exposed antimicrobial particles to the total observed area (protrusion area ratio) was calculated. Table 1 summarizes the calculation results.

TABLE 1

| | Type of antimicrobial particles | Average particle size of antimicrobial particles (μm) | Antimicrobial particle content with respect to resin material (parts by mass) | Antistatic material content with respect to resin material (parts by mass) | Thickness of peeling layer (μm) |
|---|---|---|---|---|---|
| Ex. 1 | Antimicrobial particles A | 2 | 3 | No addition | 1 |
| Ex. 2 | Antimicrobial particles A | 2 | 3.5 | No addition | 1 |
| Ex. 3 | Antimicrobial particles A | 2 | 4 | No addition | 1 |
| Ex. 4 | Antimicrobial particles A | 2 | 5 | No addition | 1 |
| Ex. 5 | Antimicrobial particles A | 2 | 5 | No addition | 2 |
| Ex. 6 | Antimicrobial particles B | 5 | 3 | No addition | 1 |
| Ex. 7 | Antimicrobial particles B | 5 | 5 | No addition | 1 |
| Ex. 8 | Antimicrobial particles A | 2 | 3 | 5 | 1 |
| Ex. 9 | Antimicrobial particles A | 2 | 5 | 2 | 1 |
| Ex. 10 | Antimicrobial particles A | 2 | 3.5 | 5.8 | 1 |
| Com. Ex. 1 | No addition | — | — | No addition | 1 |
| Com. Ex. 2 | Antimicrobial particles A | 2 | 2 | No addition | 1 |
| Com. Ex. 3 | Antimicrobial particles A | 2 | 10 | No addition | 1 |
| Com. Ex. 4 | Antimicrobial particles C | 10 | 3 | No addition | 1 |

| | Average particle size of antimicrobial particles/thickness of peeling layer | Evaluation of antimicrobial properties | Evaluation of foil adherence | Evaluation of plasticizing material resistance | Protrusion area ratio of antimicrobial particles (%) |
|---|---|---|---|---|---|
| Ex. 1 | 2 | B | A | A | 0.4 |
| Ex. 2 | 2 | B | A | A | 0.4 |
| Ex. 3 | 2 | B | A | A | 0.5 |
| Ex. 4 | 2 | B | B | B | 0.6 |
| Ex. 5 | 1 | B | B | A | 0.5 |
| Ex. 6 | 5 | B | A | B | 0.1 |
| Ex. 7 | 5 | B | B | B | 0.2 |
| Ex. 8 | 2 | A | A | A | 0.4 |
| Ex. 9 | 2 | A | A | A | 0.6 |
| Ex. 10 | 2 | A | A | A | 0.4 |
| Com. Ex. 1 | — | — | A | A | — |
| Com. Ex. 2 | 2 | NG | A | A | 0.2 |
| Com. Ex. 3 | 2 | B | NG | C | 1.3 |
| Com. Ex. 4 | 10 | B | NG | C | 0.1 |

Those skilled in the art will appreciate that the thermal transfer sheets and the like according to the present disclosure are not limited to these examples, the examples and the specification merely illustrate the principles of the present disclosure, various modifications and improvements may be made without departing from the gist and scope of the present disclosure, and all the modifications and improvements fall within the scope of the present disclosure for which protection is sought. Furthermore, the scope for which protection is sought by the present disclosure includes not only the claims but also equivalents thereof.

REFERENCE SIGNS LIST

10 thermal transfer sheet
11 first substrate
12 peeling layer
13 transfer layer
14 adhesive layer
15 coloring layer
17 back layer
20 intermediate transfer medium
21 second substrate
22 peeling layer
23 receiving layer
30, 40 printed material
31 transfer-receiving article
32 substrate for transfer-receiving article
33 receiving layer
41 substrate for transfer-receiving article (transfer-receiving article)

The invention claimed is:

1. A printed material, produced using a thermal transfer sheet, comprising a transfer-receiving article and a transfer layer, wherein the thermal transfer sheet comprises:

a first substrate; and the transfer layer, including at least a peeling layer, wherein the peeling layer contains a resin material and antimicrobial particles, wherein the antimicrobial particles have an average particle size in a range of 1 to 8 μm, wherein the peeling layer has a content of the antimicrobial particles in a range of 2.8 to 8 parts by mass per 100 parts by mass of the resin material, and wherein a surface of the peeling layer transferred to the printed material has an area ratio of protrusions of antimicrobial particles in a range of 0.05% to 3%.

2. The printed material according to claim 1, wherein the peeling layer has a thickness in a range of 0.5 to 5 μm.

3. The printed material according to claim 1, wherein a ratio of the average particle size of the antimicrobial particles to a thickness of the peeling layer (the average particle size of the antimicrobial particles/the thickness of the peeling layer) ranges from 1 to 8.

4. The printed material according to claim 1, wherein the antimicrobial particles comprise a phosphate on which antimicrobial metal ions are supported.

5. The printed material according to claim 1, wherein the peeling layer contains an antistatic material.

6. A method for producing the printed material according to claim 1, comprising the steps of:

providing the thermal transfer sheet and the transfer-receiving article; and transferring the transfer layer of the thermal transfer sheet onto the transfer-receiving article.

7. The method for producing the printed material according to claim 6, further comprising a step of irradiating the transfer-receiving article with bactericidal rays after the transfer of the transfer layer.

8. A printed material production system for producing the printed material according to claim 1, comprising:

a thermal transfer printer; and a sterilization mechanism.

9. A printed material, produced using an intermediate transfer medium, comprising a transfer-receiving article, a peeling layer and a receiving layer, wherein the intermediate transfer medium comprises:

a second substrate;

the peeling layer; and the receiving layer, wherein the peeling layer contains a resin material and antimicrobial particles, wherein the antimicrobial particles have an average particle size in a range of 1 to 8 μm, wherein the peeling layer has a content of the antimicrobial particles in a range of 2.8 to 8 parts by mass per 100 parts by mass of the resin material, and wherein a surface of the peeling layer transferred to the printed material has an area ratio of protrusions of antimicrobial particles in a range of 0.05% to 3%.

10. A method for producing the printed material according to claim 9, comprising the steps of:

providing the intermediate transfer medium and the transfer-receiving article;

forming an image on the receiving layer of the intermediate transfer medium; and transferring the peeling layer and the receiving layer of the intermediate transfer medium onto the transfer-receiving article.

11. The method for producing the printed material according to claim 10, further comprising a step of irradiating the transfer-receiving article with bactericidal rays after the transfer of the peeling layer and the receiving layer.

* * * * *